Oct. 23, 1923.
C. WOOD
OIL FILTER
Filed March 10, 1920  2 Sheets-Sheet 1
1,471,994
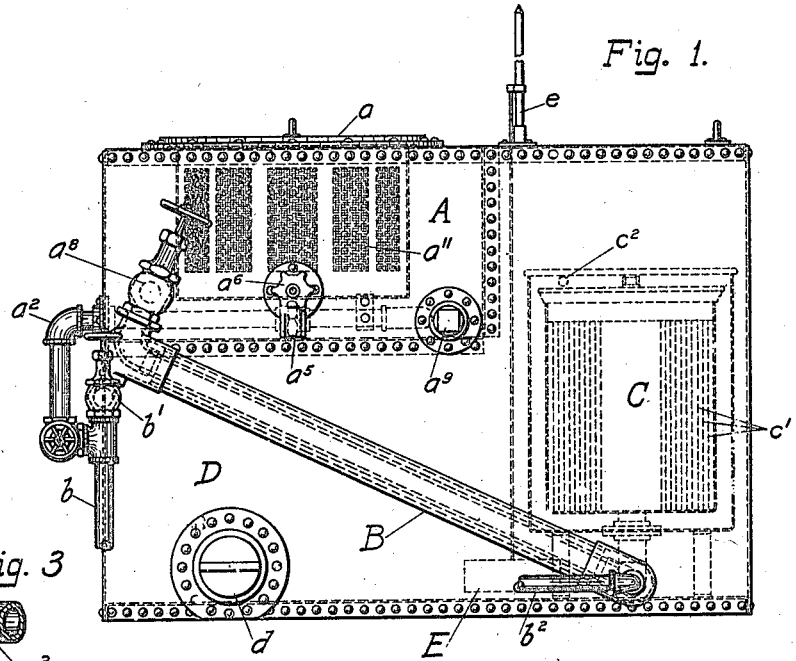
Fig. 1.
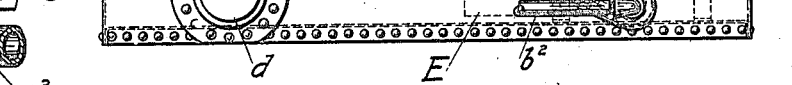
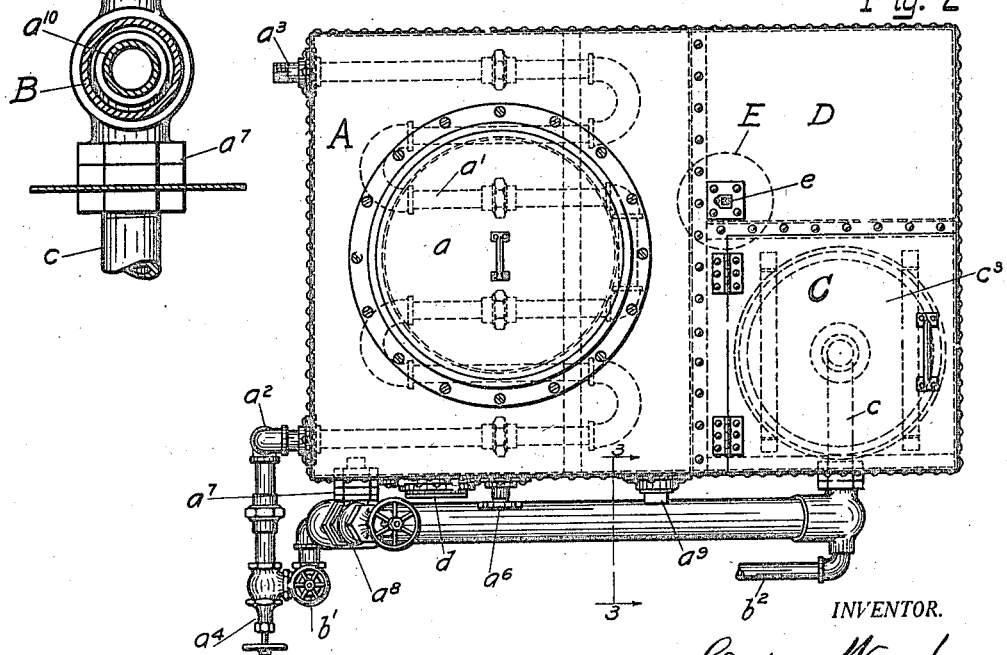
Fig. 2
Fig. 3
INVENTOR.
Carver Wood
BY
Walter A. Knight
ATTORNEY.

Patented Oct. 23, 1923.

1,471,994

UNITED STATES PATENT OFFICE.

CARVER WOOD, OF FORT WAYNE, INDIANA, ASSIGNOR TO WAYNE OIL TANK AND PUMP COMPANY, OF FORT WAYNE, INDIANA, A CORPORATION OF INDIANA.

OIL FILTER.

Application filed March 10, 1920. Serial No. 364,666.

*To all whom it may concern:*

Be it known that I, CARVER WOOD, a citizen of the United States, residing at Fort Wayne, in the county of Allen and State of Indiana, have invented new and useful Improvements in Oil Filters, of which the following is a specification.

My invention relates to oil filters of the type known as batch filters, that is, those adapted to treat a batch of dirty oil at a time, instead of so-called continuous filters, that is, those having dirty oil fed to them constantly during the operation of the apparatus.

In batch filters, the dirty oil is poured into a settling reservoir suitably provided with steam pipes and the oil heated sufficiently thru the steam pipes, to cause the dirt to most readily separate from the oil. Then the heat is turned off and the dirty oil allowed to stand a sufficient time to allow the dirt to settle to the bottom of the reservoir, usually over night. Then the oil, freed from the precipitated dirt, is piped off to the cloth or other strainer for final treatment.

But it has been found when handling oils that congeal when chilled, such as cutting oils, that these strainer cloths do their work imperfectly, slowly and often fail to work after a slight amount of the oil to be treated has passed thru them, because the cold oil congeals upon the filter cloth, rendering it impervious to the passage of more oil thru it.

In order to overcome this difficulty, steam is sometimes re-applied to the precipitation reservoir, but no matter how gradually, agitation results and a part, at least, of the beneficial effect of precipitation is lost.

My invention consists structurally of a simplified and compact apparatus of few parts for the purification of the "dirty" oil resulting from mechanical operations, as in machine shops, etc., that includes all the necessary adjuncts in a single casing of comparatively small dimensions, arranged in such relations as to attain superior results in purification, and at the same time to be removable as a whole to any position deemed more convenient of use.

To this end the invention consists of a tank of preferably substantially cubical form, the forward upper part of which is partitioned off to constitute a receiving and precipitating chamber containing a "screen basket" through which the dirty oil first passes; an exterior steam jacketed gravity conduit connecting said chamber at about the level of the bottom of the screen basket, rearwardly and downwardly and re-entering the tank and passing upwardly into a fixed filter strainer which discharges at its top into the main tank at about the level of the intake of said conduit.

Minor features such as sampling outlets, valves, steam coils, etc., will be explained later.

The space in the main tank excepting that occupied by the precipitating chamber is useful as containing a considerable body of purified oil in which disturbance is minimized by the solidity and entire absence of movement of the main tank which rests with broad base upon the floor, and by the relatively large body of contained oil in which precipitation still continues and renders the ultimate purification more complete and perfect than can otherwise be attained.

My invention is illustrated in the accompanying drawings, in which:—

Figure 1 is a side elevation of a batch filter, showing my improvement in position for use, Fig. 2 is a top plan view of the same.

Fig. 3 is a cross section thru the steam jacketed conveyor pipe on the line 3—3 of Fig. 2.

Figure 4:
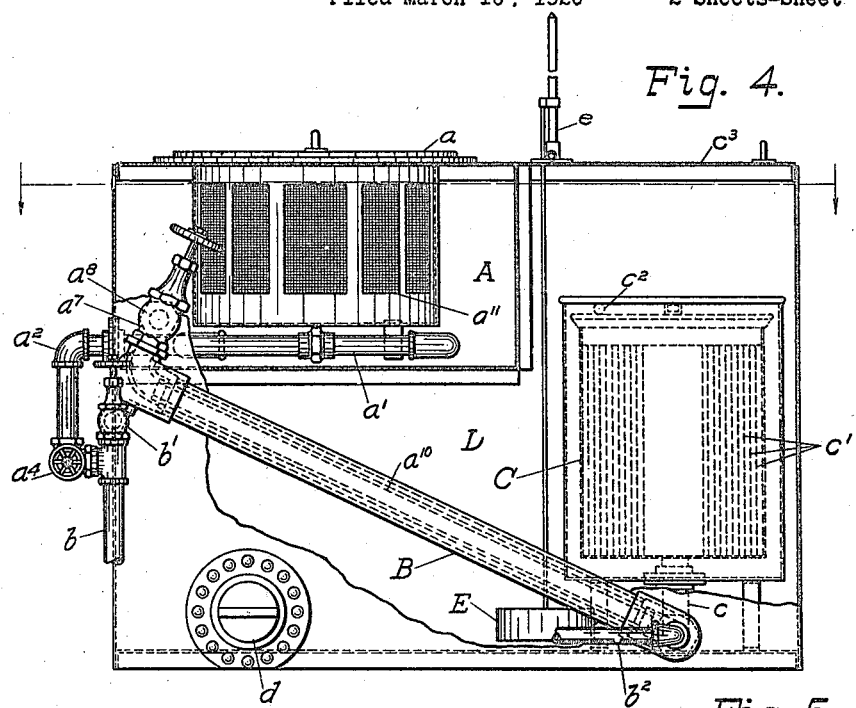
Fig. 4 is a side elevation of the filter with nearly all the casing cut and broken away to expose the interior mechanism and show the relation of parts to each other; and, Fig. 5 is a top plan view with the top of the casing cut away showing the relative position of the parts.
Figure 5:
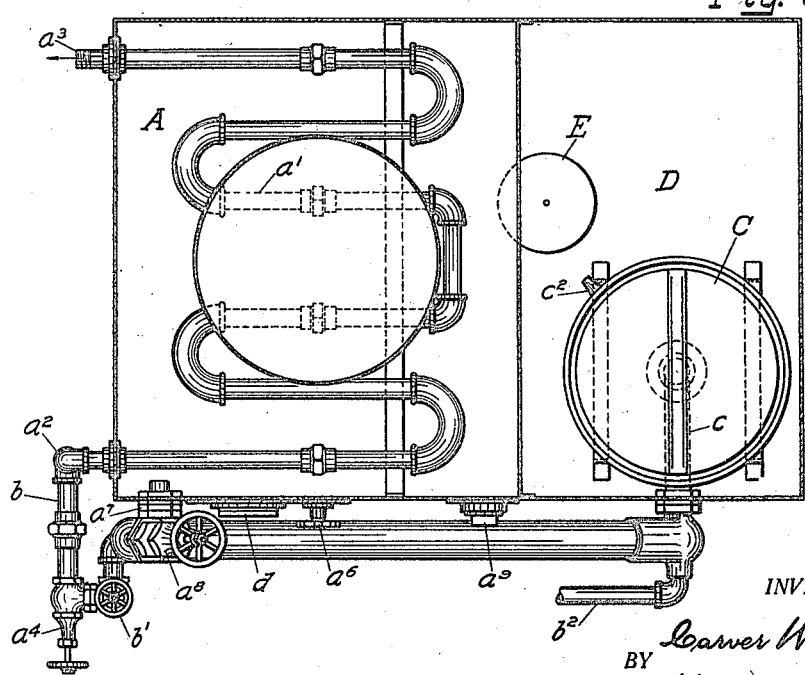

Referring now to the drawings, A, is a precipitation reservoir, with a cover $a$, adapted to be easily removed to pour in the dirty oil, a steam coil $a^1$; with inlet $a^2$, and outlet $a^3$, and a valve $a^4$, to control the admission of steam to the coil thru the pipe $b$, from a source of supply not shown. A screen basket $a^{11}$, preferably of fine mesh wire, strains the incoming dirty oil. A sampling outlet lip $a^5$, is controlled by a plug valve $a^6$, adapted when open to permit a thin film of oil to flow out over the outlet lip $a^5$, and thus allow the operator to determine by the color of the oil, the extent to which the dirt has precipitated. This sampling outlet is on a level with the main outlet $a^7$, controlled by the valve $a^8$. A clean-out plug $a^9$, is provided at the bottom of the tank to enable the operator to remove the dirt from the precipitation reservoir A.

Connected to the outlet valve $a^8$, is a drain pipe $a^{10}$, to convey the oil from which the sediment has been precipitated in the reservoir A, to the filter strainer C, thru its inlet pipe $c$.

The drain pipe $a^{10}$, is provided with a steam jacket B, connected thru the valve $b^1$, to the steam supply pipe $b$, and provided at its lower end with a steam outlet $b^2$. The oil that flows into the filter strainer C, thru the inlet pipe $c$, passes thru the filter cloth $c^1$, where it deposits its remaining impurities, and the purified oil overflows thru the outlet $c^2$, into the storage reservoir D. A cover $c^3$, affords easy access to the filter strainer. A clean-out plug $d$, affords easy access to the tank D, for cleaning. A float E, and indicator $e$, keep the operator advised of the quantity of purified oil in the tank D.

The filter strainer may be of any desired form.

I claim as my invention and desire to secure by Letters Patent of the United States:—

1. In a batch filter of the character indicated, in combination with a general container, having a precipitation chamber within the same; a filter strainer also within said container, an external gravity connection between said precipitation chamber and filter and means for applying external heat to said gravity connection.

2. In combination with a batch filter having a precipitation reservoir with means therein for heating the contents of same, and a filter strainer, both in a single casing; a connection outside said casing to convey by gravity partly clarified oil from the precipitation reservoir to the filter strainer, and means for applying heat to said connection.

3. In combination with a batch filter having a primary strainer, a precipitation reservoir, means for heating the contents of said reservoir, and a filter strainer, all in a single casing; a connection outside said casing to convey partly clarified oil from the precipitation reservoir to the filter strainer, and means for heating said connection.

4. In combination with a batch filter having a precipitation reservoir, means within said reservoir for heating the contents of said reservoir, a filter strainer, and a clarified oil storage reservoir, all in a single casing; a steam jacketed oil connection outside said casing to convey partly clarified oil from the precipitation reservoir to the filter strainer.

In testimony whereof I have hereunto set my hand in presence of two subscribing witnesses.

CARVER WOOD.

Witnesses:
LAWRENCE H. PARROT,
JOHN R. WERNHOFF.